United States Patent [19]

Klusmier

[11] 3,741,408

[45] June 26, 1973

[54] TRANSFER APPARATUS
[75] Inventor: Kenneth L. Klusmier, Worcester, Mass.
[73] Assignee: Morgan Construction Company, Worcester, Mass.
[22] Filed: Aug. 2, 1971
[21] Appl. No.: 168,276

[52] U.S. Cl............................................. 214/1 QG
[51] Int. Cl............................................... B65g 7/00
[58] Field of Search................ 214/1 P, 1 PB, 1 BD, 214/1 QG

[56] References Cited
UNITED STATES PATENTS
2,525,305  10/1950  Lombard........................... 214/1 P X
2,960,240  11/1960  Evans................................ 214/1 QG FOREIGN PATENTS OR APPLICATIONS
906,323  3/1954  Germany........................... 214/1 QG Primary Examiner—Gerald M. Forlenza
Assistant Examiner—Frank E. Werner
Attorney—Chittick, Pfund, Birch, Samuels & Gauthier

[57] ABSTRACT

An apparatus for transferring elongated elements from a first location to a laterally disposed second location. The apparatus includes a plurality of transfer members which are pivotally manipulated by operating means in a manner such that an elongated element at the first station is engaged at spaced points along its length by the transfer members and carried along the upper portion of a generally elliptical path to the second location.

4 Claims, 5 Drawing Figures

PATENTED JUN 26 1973 3,741,408

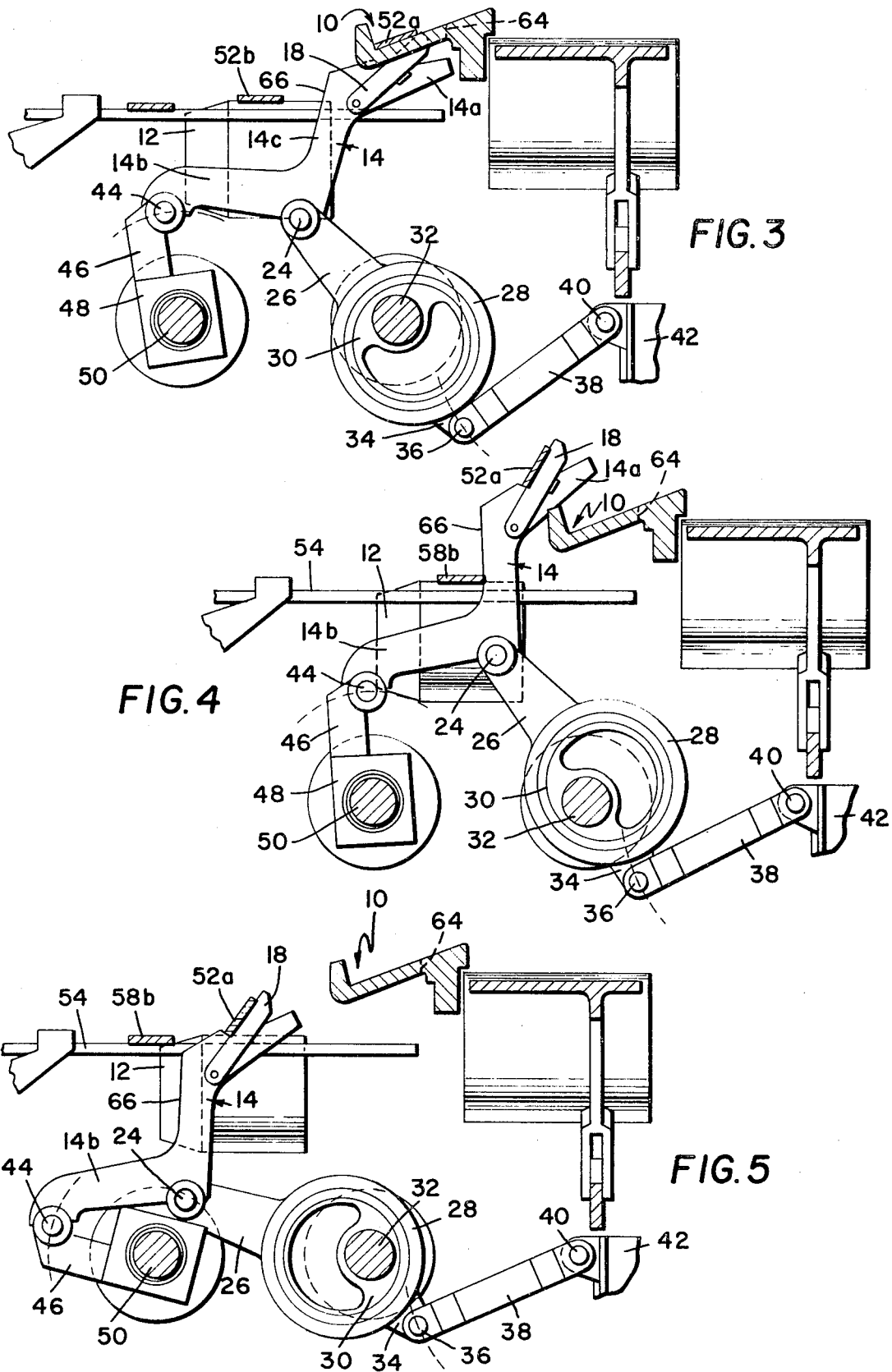

TRANSFER APPARATUS

DESCRIPTION OF THE INVENTION

This invention relates generally to the art of material handling, and in particular to a novel and improved apparatus for removing elongated elements from a notch, recess or other like depression and for transferring the said elements to another laterally disposed support structure. The invention is especially useful in transferring product lengths, such as for example the rolled sections produced by a rolling mill, from a sliding notch onto laterally disposed alignment rollers. However, it will be appreciated from the following detailed description that other uses are also contemplated.

One object of the present invention is the provision of a transfer apparatus which does not slide, scrape or otherwise risk marring the surface of elongated elements during the transfer thereof from one location to another. Another object of the invention is to provide a transfer apparatus which is especially adapted to the removal of elongated elements from a notch or other like depression. To this end, the apparatus has incorporated therein a vertical lift feature which insures that elements clear the notch sides, even when some sag is experienced. Still another object of the present invention is to provide a means for preventing or at least diminishing sag in relatively flexible flat elements during the transfer thereof from one location to another. This is accomplished by manipulating the transfer members so as to turn each element on its edge during the lifting operation, thus bringing the width of the element into closer alignment with the vertical plane.

These and other objects and advantages of the present invention will become more apparent as the description proceeds with the aid of the accompanying drawings wherein:

FIGS. 3–5 are views similar to FIG. 2 showing the operational sequence of the transfer apparatus.

Figure 1:
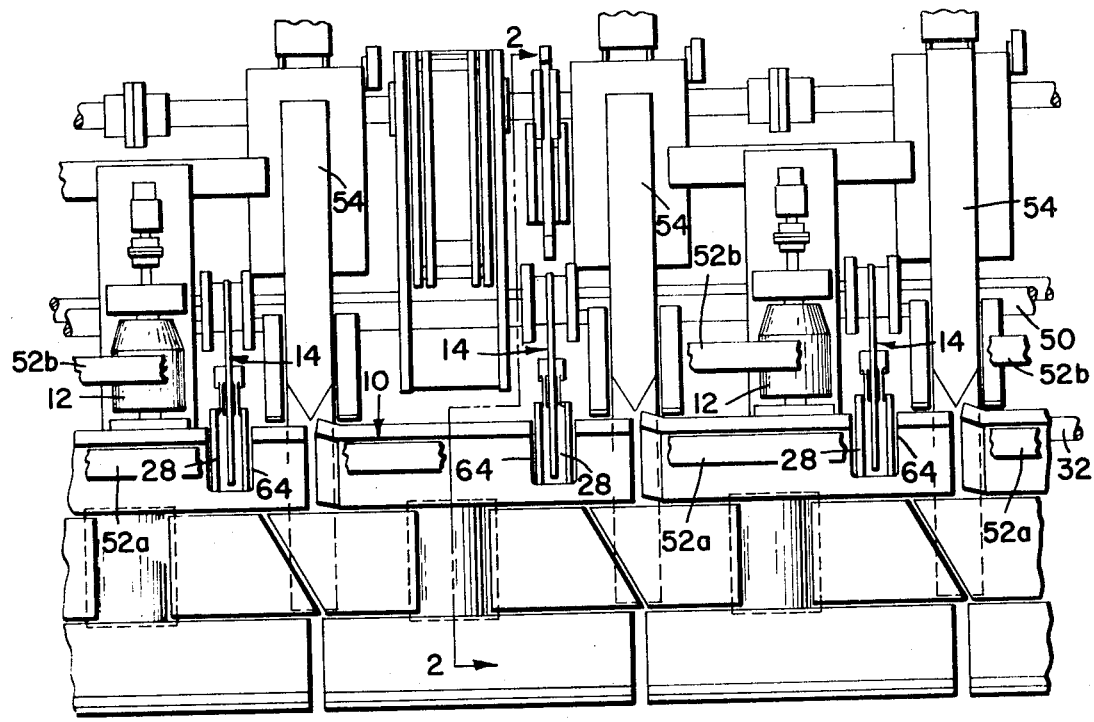
FIG. 1 is a plan view of a material handling system including as a part thereof a transfer apparatus embodying the concepts of the present invention.
Figure 2:
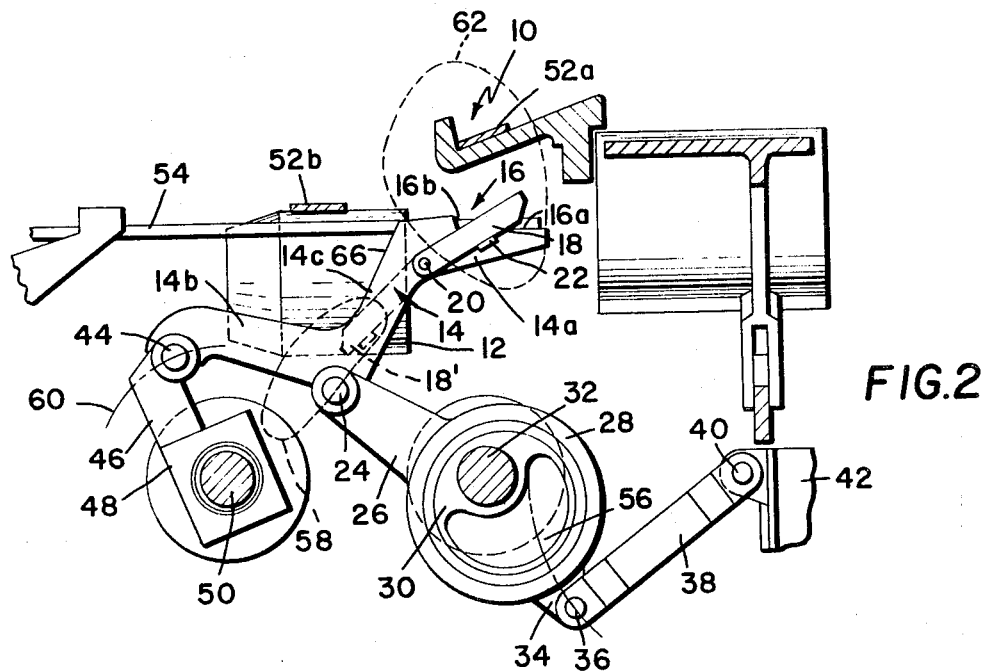
FIG. 2 is a sectional view taken along line 2—2 of FIG. 1.

Referring initially to FIGS. 1 and 2, the invention is shown in conjunction with a material handling apparatus of the type described in U.S. Pat. application Ser. No. 164,601 filed on July 21, 1971 and assigned to the same assignee as the present invention. The material handling apparatus includes a receiving notch 10 at a "first location." A plurality of spaced alignment rollers 12 are arranged at a "second location" to one side of the receiving notch 10. The present invention operates to transfer elongated elements from the receiving notch 10 onto the alignment rollers 12, and includes a plurality of transfer members 14. Each transfer member has a curved configuration with upper and lower oppositely extending sections 14a and 14b joined by an intermediate section 14c. The upper section 14a includes an element engaging notch 16 having a bottom 16a and an upstanding side wall 16b. A lever 18 is pivotally attached to the transfer member 14 as at 20 for movement from an inoperative position (shown in dotted at 18' in FIG. 2) to an operative position resting on a stop 22. When operatively positioned, the lever 18 subdivides the angle formed between the notch bottom 16a and side wall 16b.

Each transfer member 14 is pivotally connected as at 24 to an arm 26 extending radially from a yoke member 28. An eccentric 30 is journalled for rotation in each yoke member 28. The eccentric 30 is in turn keyed to a rotatable drive shaft 32 which extends in a direction parallel to the overlying receiving notch 10.

Each yoke member 28 is additionally provided with another shorter radially extending arm 34 which is pivotally connected as at 36 to one end of a link 38. The other end of the link 38 is pivotally connected at 40 to a fixed support structure 42.

Each transfer member 14 is additionally pivotally connected as at 44 to an arm 46 extending laterally from a collar 48 which is in turn journalled for rotation about an axis spaced laterally from and parallel to drive shaft 32. As herein illustrated, this axis is defined by a second shaft 50.

In the condition illustrated in FIG. 1, the transfer members are at the lowermost or beginning point in the transfer cycle. An elongated element, which may for example comprise a flat length of roller stock 52a, is shown at rest in the receiving notch 10. Another previously transferred element 52b is shown on the alignment rollers 12. The alignment rollers 12 protrude above the upper edges of transfer skids 54, the latter being extendable by means described in the previously mentioned U.S. Pat. application Ser. No. 164,601.

When handling flat elements, the levers 18 on each transfer member 14 are preferably pivoted to their operative positions as shown by the solid lines in FIG. 2. The purpose of this adjustment will be described presently.

The transfer cycle involved in moving element 52a from notch 10 onto the alignment rollers 12 and for simultaneously shifting element 52b off of the alignment rollers and onto the skids 54 is carried out by rotating drive shaft 32 one full revolution in the counterclockwise direction. Because of the geometry and cooperative relationship of the various elements described above, the following movements occur in response to corresponding rotation of each eccentric 30: link 38 pivots about point 40, and the point of pivotal connection 36 between the link 38 and the yoke arm 34 travels upwardly and then back down along an arcuate path shown in dotted at 56; the point of pivotal connection 24 between yoke arm 26 and the transfer member 14 travels around a somewhat elliptically shaped closed path 58; the point of pivotal connection between the transfer member 14 and the arm 46 on collar 48 moves to the right and then back towards the left along another arcuate path 60; and the distal end of the upper section 14a of the transfer member 14 travels a generally elliptical closed path 62. It will of course be understood that each of the transfer members 14 shown in FIG. 1 is provided with an operating means identical to that shown in FIG. 2. Hence, rotation of drive shaft 32 imparts identical motion to each of the transfer members.

FIGS. 3 to 5 depict the apparatus at different stages during one complete transfer cycle. In FIG. 3, the transfer members 14 have moved upwardly to contact the flat element 52a in notch 10. As is best shown in FIG. 1, the notch sides are cut away as at 64 to accommodate movement therethrough of the transfer members 14. The operatively positioned levers 18 engage the flat element 52a and cause it to initially pivot in a counterclockwise direction while still supported by the inside corner of the notch 10. This is advantageous in that it brings the width of the element into closer alignment with the vertical before the element is lifted out of the notch 10, thereby diminishing the likelihood of the element subsequently sagging between the transfer members. FIG. 4 shows the transfer members at the uppermost point of their travel. FIG. 5 shows the transfer members depositing the flat element 52a on the alignment rollers 12. At this stage, the back sides 66 of the transfer members have already contacted and pushed the previously transferred element 58b off of the alignment roller 12 and onto the skid members 54. Continued rotation of drive shaft 32 returns all of the transfer members to the initial position shown in FIG. 2 in preparation for transfer of the next succeeding element.

In light of the foregoing description, it will now be apparent to those skilled in the art that the present invention offers a number of important advantages not available with conventional known arrangements. For example, it is important to note that the elements are transferred from notch 10 onto alignment rollers 12 in a manner which avoids sliding or scraping. This is due to the particular geometry and cooperative relationship of the elements employed, and in particular to the vertical movement imparted to the elements as they are lifted out of the notch 10 and subsequently deposited on the alignment rollers. This vertical movement is accompanied by a turning of the elements (particularly when the levers 18 are operatively positioned to handle flats) to prevent or at least materially diminish sagging. Where different cross sections are being handled, such as for example channels or angles, their inherent rigidity and resistance to sagging may obviate the necessity of employing the levers 18.

The downward stroke of the transfer members further accomplishes the secondary function of moving each previously deposited element off of the alignment rollers onto the laterally extending skids. Here, sliding is not a problem because the surfaces of the rollers are relatively smooth. The foregoing operations are accomplished by rotatably driving a single shaft, thus simplifying the entire transfer operation while at the same time reducing control and maintenance requirements.

It will of course be understood that the invention is not limited in application to the transfer of rolled mill products from a sliding notch onto alignment rollers, and that the same or equivalent arrangements may be employed to transfer other types of elements and products between laterally spaced locations. It is accordingly my intention to cover all changes and modifications to the embodiment herein chosen for purposes of disclosure which do not depart from the spirit and scope of the invention as defined by the claims appended hereto.

I claim:

1. In an apparatus for transferring elongated elements from a first location to a laterally disposed second location, wherein a plurality of spaced transfer members are arranged to operate between said locations, with each of said transfer members having one end suitably adapted to engage and carry the elongated elements, operating means for pivotally manipulating said transfer members in a manner such that elongated elements at the first location are engaged at spaced points along their lengths by said transfer members and carried along the upper portion of a generally elliptical path to the second location, said operating means comprising: a rotatable shaft underlying said transfer members; a plurality of eccentrics, one for each of said transfer members, said eccentrics being fixed relative to said rotatable shaft and each said eccentrics being journalled for rotation in yoke members; link means pivotally connected at one end to said yoke members and at the other end to fixed support means; first arm means extending radially from each of said yoke members to a point of pivotal connection with each of said transfer members; and second arm means journalled for rotation about an axis disposed laterally from and parallel to said rotatable shaft, said second arm means each being pivotally connected to said transfer members at a point disposed laterally from the point of pivotal connection of said first arm members to said transfer members, whereupon rotation of said rotatable shaft will cause movement of the said one ends of said transfer members along said generally elliptical curved path.

2. The apparatus as claimed in claim 1 wherein the said one end of each said transfer members defines an element receiving notch with a generally flat bottom and a side wall disposed at an angle relative to said bottom.

3. The apparatus as claimed in claim 2 wherein each of said transfer members is provided with a pivotal element movable from an inoperable position remote from said notch to an operative position subdividing the angle formed between the bottom and side wall of said notch.

4. The apparatus as claimed in claim 1 wherein the arrangement of said operating means is such that an element carried by said transfer members is rotated about its longitudinal axis in an initial counterclockwise direction and then back in a clockwise direction while being transported between said first and second locations.

* * * * *